June 20, 1939. M. F. HAMMOND 2,163,320
SAWING APPLIANCE
Filed May 1, 1937 3 Sheets-Sheet 3
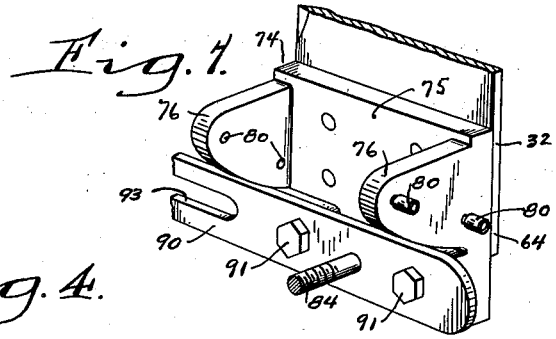
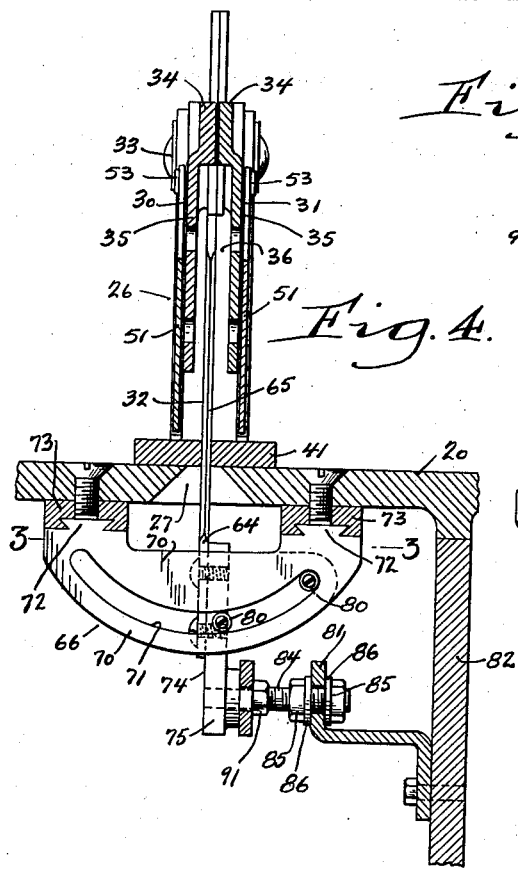
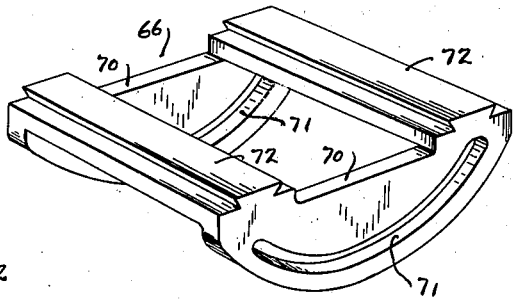
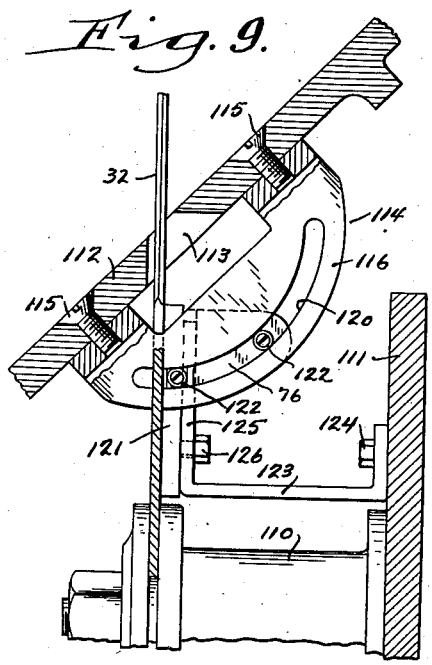
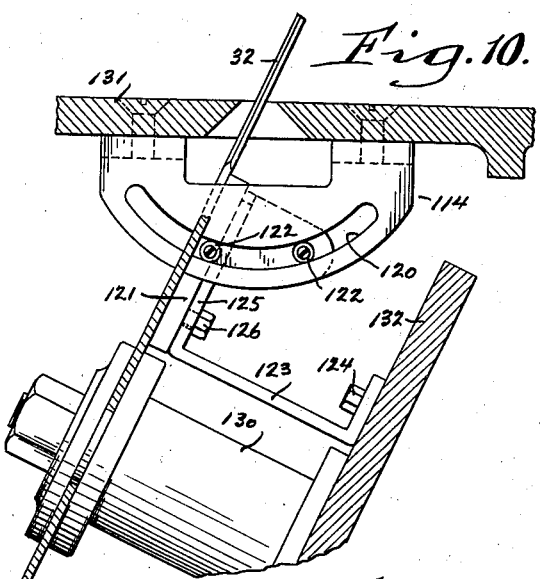
Inventor,
MICHAEL F. HAMMOND
by J.W. Ellis
Attorney

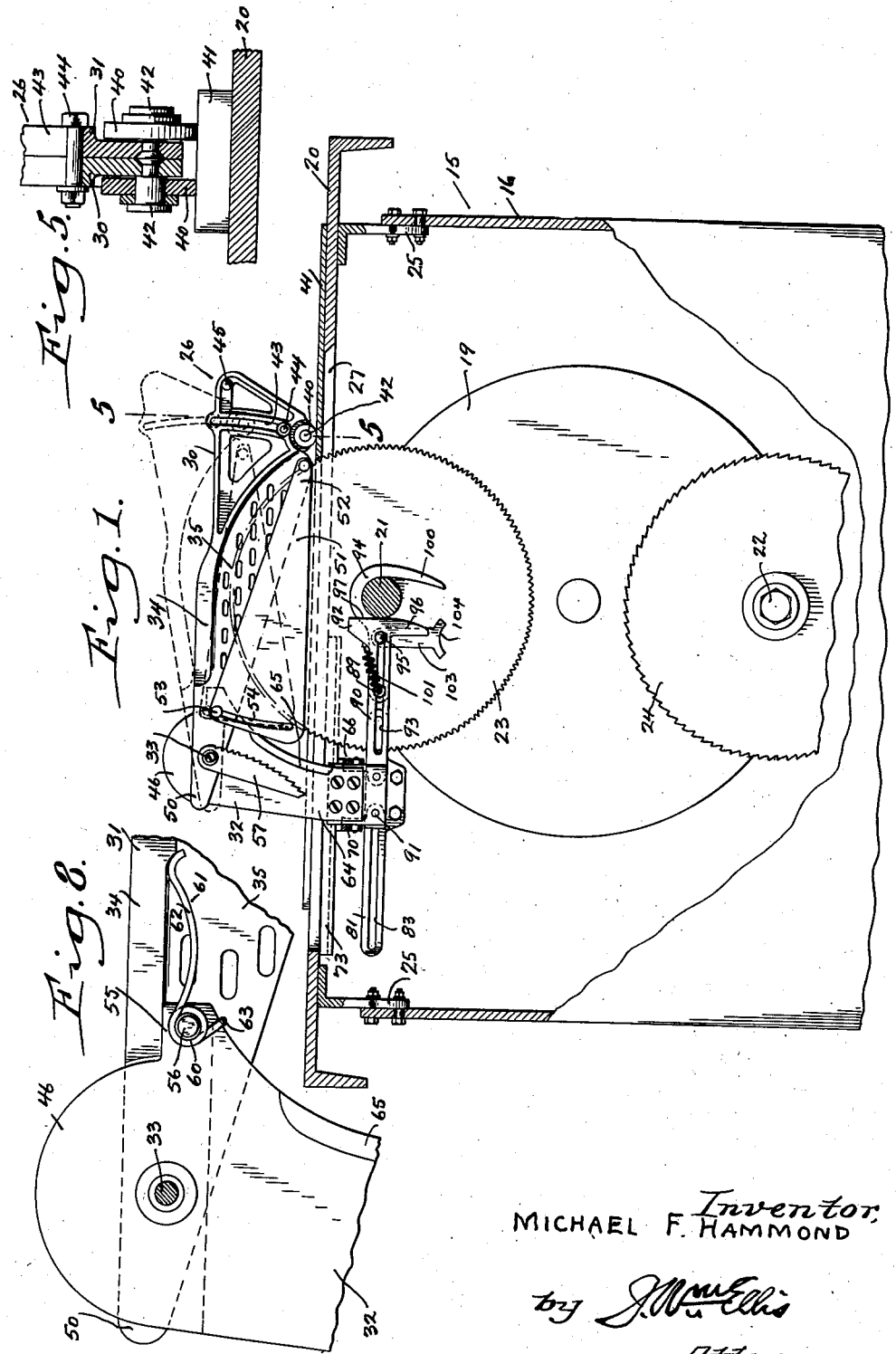

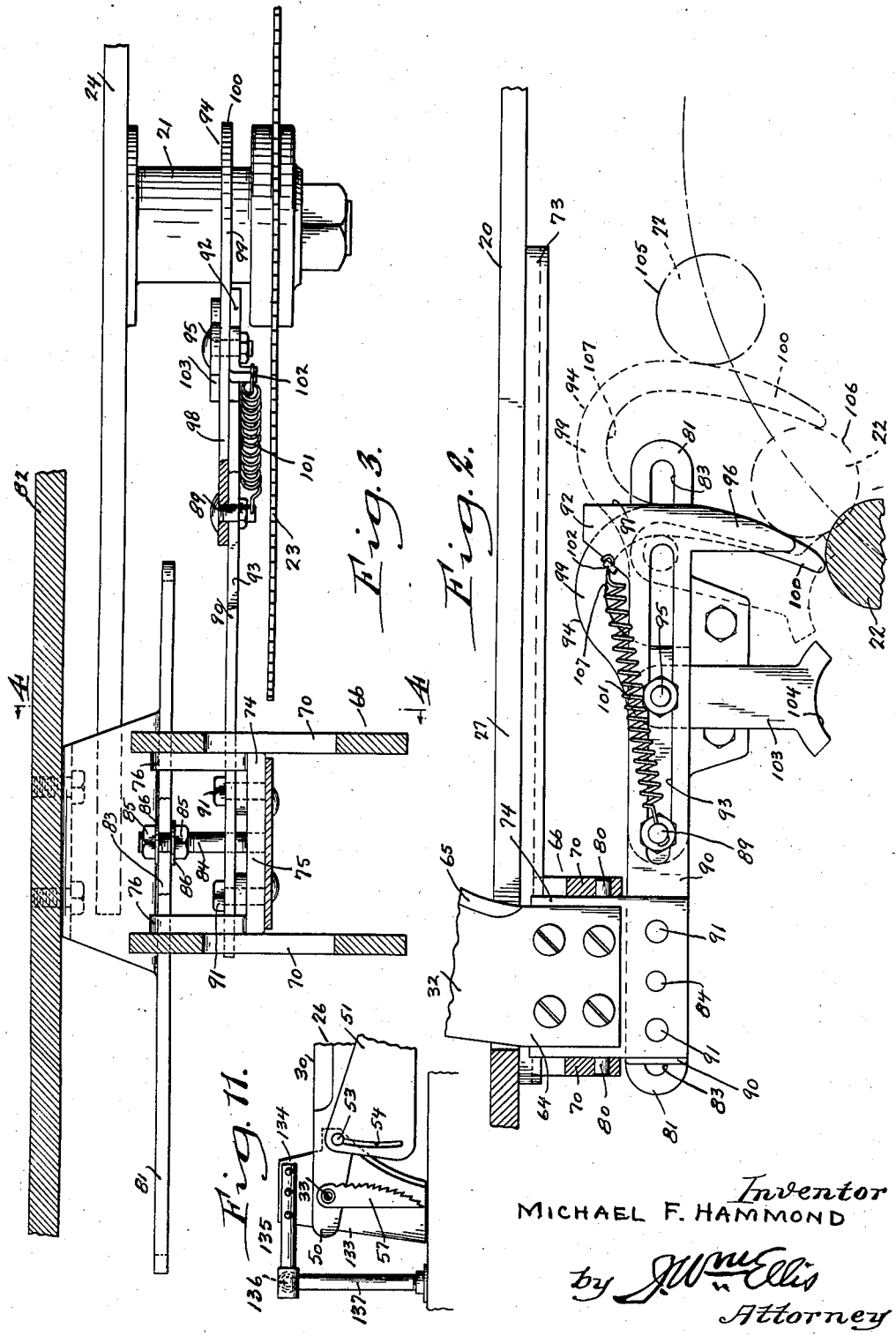

Patented June 20, 1939

2,163,320

UNITED STATES PATENT OFFICE 2,163,320

SAWING APPLIANCE

Michael F. Hammond, Buffalo, N. Y., assignor of one-half to William P. Morgan, Buffalo, N. Y.

Application May 1, 1937, Serial No. 140,242

8 Claims. (Cl. 143—159)

My invention relates in general to sawing appliances of the circular saw type, and particularly to guards for circular saws and means for holding and moving such guards.

It is well known to those skilled in the art that the saw guards of the ordinary sawing appliance of this type are usually mounted upon an arm which is supported at the edge of the saw table, and that when such guards are used with an appliance having a tilting saw table or saw arbor, they usually must be disconnected or moved out of the way and to a position of non-use while the table or saw is being used in tilted position. Furthermore, such guards, when used in connection with double arbor saws, must usually be adjusted to the position of the saw when the same is moved toward either end of the slot in adjusting the same, or when the saws are being changed.

It has been the principal object of my device to provide a saw guard having a support so arranged that it will lie in substantially the same plane as the plane of the circular saw, irrespective of the angular position of the work table or the angle of the saw in cases where the saw arbor is tilted instead of the table.

Another object has been to provide a guard made in two sections whereby one section may be elevated, thus enabling the operator to see and saw to a line on the work piece, while at the same time, effectively guarding the saw.

Another object has been to provide a shutter at each side of the saw guard so as to make the guard more efficient.

Another object has been to provide a support for the guard which is so designed that it may be made to act as a spreader for the work piece as it is being operated upon by the saw.

A further object has been to provide means for mounting the guard support so that when my device is to be used on a sawing appliance having two saw arbors, it will be moved back and forth as the saw is moved in the slot to adjust its height with respect to the table or as the saws are being changed.

Moreover, it has been an object to provide automatic means for coupling the guard support and the saw arbor together and to prevent such coupling under conditions which would cause the saw to be injured.

Furthermore, my device provides means for counter-balancing the saw guard so that minimum resistance will be offered by the guard during the sawing operation.

My invention has been designed with the idea of convenience of operation and safety to operators when in use.

My invention is of such nature that it may be used on all types of sawing appliances whether of the tiltable table type of the tiltable arbor, or of the raising and lowering table or arbor type. Furthermore, it is adaptable to appliances having a single circular saw or to those having two circular saws, and it may also be used where dado work is being done by the sawing appliance.

The above objects and advantages have been accomplished by the device shown in the accompanying drawings, of which:

Fig. 1 shows a side elevation, partly in section, of a sawing appliance of the circular saw type and of double-arbor construction, with my invention applied thereto.

Fig. 2 is an enlarged, fragmentary, sectional, side elevation, somewhat diagrammatic, showing the operating arm for the guard support in its extreme rearward position.

Fig. 3 is an enlarged, sectional, plan view taken on line 3—3 of Fig. 4.

Fig. 4 is an enlarged, fragmentary, sectional elevation of my device and is taken on line 4—4 of Fig. 3.

Fig. 5 is an enlarged, fragmentary, sectional view taken on line 5—5 of Fig. 1.

Fig. 6 is an enlarged, perspective view of the quadrant hinge for use on a two-arbor sawing appliance.

Fig. 7 is a similar view of the bearing bracket for the quadrant hinge of Fig. 6.

Fig. 8 is an enlarged, fragmentary, sectional view showing the guard mounting and the counter-balancing spring.

Fig. 9 is a transverse, sectional elevation of my invention in slightly modified form and applied to a sawing appliance having a tiltable table and having but a single saw arbor.

Fig. 10 is a similar view showing the form of invention of Fig. 9 as applied to a saw table having a single tiltable saw arbor.

Fig. 11 is a fragmentary view of modified means for attaching the guard support.

Referring now to the drawings and more particularly to the form of device shown in Figs. 1–8, inclusive, 15 represents the sawing appliance which is provided with the usual body 16 and table 20. As hereinbefore pointed out, the saw table shown in the figures mentioned, is of the double-arbor type having saw arbors 21 and 22 carrying cross-cut and rip saws 23 and 24, respectively. As is customary in this type of double-arbor saw table, the arbors 21 and 22 are carried by a saw arbor disc 19 which is operated to adjust the height of the saw above the top of the table 20 or to bring either saw into operative relation by means which are well known to those skilled in the art. Since these means do not form a part of my invention they are, therefore, not shown or described. The table top 20 has a slot 27 therein for the reception of either of the circular saws. Furthermore, the sawing appliance shown is of the type provided with means whereby the top 20 may be tilted. The usual and well known type of quadrant hinge 25 may be used for this purpose.

My saw guard 26 is made in two parts 30 and 31 which are disposed one on each side of the guard support 32, to be hereinafter described, by a suitable pivot pin 33. Each guard part is provided with a rib portion 34 and a wall portion 35. The rib portions are offset with relation to the wall portions and are arranged adjacent each other, whereby a space 36 is provided for the accommodation of the saw. The side walls 35 may be perforated as shown, if desired, to provide for air and observation. The ribs 34 at the front of the guard are curved downwardly to conform substantially to the periphery of the saw when it is extended the maximum distance above the saw table 20. The parts of the guard are extended forwardly beyond the curved portion of the rib 34 and contact with each other, as shown in Fig. 5. Each of the guard parts is provided with a roller 40, each of which extends down below the lower surface of each part of the guard, whereby the work piece 41 may be easily engaged with the guard and the resistance offered by the guard during the sawing operation thereby reduced. Each of these rollers is carried by a suitable pin 42 which is suitably secured to the guard part. Each of the guards is provided with an arcuate slot 43 which extends upwardly from a point near the position of the rollers and which is struck from a radius equal to the distance from the slot to the guard pivot pin 33 carried by the support 32. This, it will be seen, permits either part of the guard to be moved upwardly with relation to the other part, as shown in dotted lines in Fig. 1. A bolt 44 is mounted in the slot whereby the guard parts may be locked together in their desired relative positions.

Each part of the guard is provided preferably with a lifting knob 45 which may be located at the extreme outer end thereof, as shown in Fig. 1.

The support 32 for the guard has an upper portion 46 which is substantially semi-circular in form and which presents an extended bearing area for the parts 30 and 31 of the guard. The ends 50 of the guard parts are of such proportion that they extend over the surface of the semi-circular portion of the support, whereby the guard is freely pivoted but will be maintained in rigid alignment with the saw and prevented from side movement in relation thereto. Carried by each of the guard parts 30 and 31 is a guard shutter 51 which is wedge-shape in form and pivoted at its forward, narrow end 52 to the front lower edge of the wall 35 of the guard part. The shutter preferably overlaps the wall of the guard part, as shown in Fig. 1, and its rear end is attached to the wall by means of a pin 53. This pin is mounted in an arcuate slot 54 formed at the rear end of the shutter and struck from a radius equal to the distance from the slot to the pivotal connection of the forward end 52 of the shutter. The rear end of the shutter, therefore, is permitted to move up and down with relation to the guard part so that between the guard part and the shutter there will be a more or less universal movement which will cause the guard to adapt itself to work pieces of various thicknesses while, at the same time, effectively enclosing the saw no matter what the elevation of the guard may be. These shutters may, if desired, also be provided with apertures like the walls 35 of the guard.

The upper semi-circular part 46 of the support 32 has a forwardly extending arm 55 which forms a ledge or stop for the parts 30 and 31 of the guard. The ribs 34 of each part of the guard are extended rearwardly up to substantially the circular surface of the semi-circular part 46 and thereby engage with the stop 55 so as to limit the downward movement of the guard. This stop carries a pin 56 around which is disposed the circular portion 60 of a bearing spring 61. This spring is provided with two side arms 62, each of which extend forwardly and engage the rib 34 of one part of the guard. Each of the loops 60 of the spring is arranged on opposite sides of the stop 55, and these loops are connected together by a cross member 63 which engages the under surface of the stop 55 and maintains the spring in the position shown in Fig. 8. As here shown, the spring is under compression and tends, with slight elevating movement at the outer end, to raise the guard.

The guard support 32 is preferably of thin metal and is provided with a downwardly extending body portion 64 which is disposed within the slot 27 in the table top and which preferably is of a thickness slightly greater than the size of the kerf made by the circular saw, whereby the support acts as a spreader for the work as it is being sawed and forced past it. The upper semi-circular portion 46 of the support is preferably reinforced so as to increase its thickness, for the proper support of the pivot pin 33, and the provision of a suitable surface on the stop arm 55. The forward surface 65 of the support may be bevelled from each side so as to present a knife edge to the work which will act to guide the work piece 41 around both sides of the support as it is being fed across the table, as shown in Figs. 1 and 4.

My device is preferably provided with dogs 57, arranged one on each side of the parts 30 and 31 of the guard. These dogs engage with the top surface of the work piece as it is being fed under the guard and the lower edge surfaces of the dogs are notched, as is customary, so that they engage with the work piece and prevent the same from being forced backwardly by the rotation of the saw.

Since the support must lie in substantially the same plane as the circular saw and since it must remain in such plane irrespective of the relative position of the table with respect to the saw, it is necessary to have a suitable mounting for the support which will bring about this condition. This is accomplished by a quadrant hinge 66, shown clearly in Fig. 6. This quadrant hinge is provided with two side arms 70 each of which is provided with an arcuate slot 71 so designed as to have the center from which it is struck located within the slot 27 of the table. This quadrant is provided with two parallel, dove-tailed members 72 running lengthwise the bracket and at right angles to the side arm 70, and these dove-tailed members are mounted in suitable ways or tracks 73 carried on the under side of the table top 29 and parallel with the slot 27 thereof. Obviously, one of these ways is provided at each side of the slot 27 so as to bring the center of the arcuate slot in the center of the slot 27. The reason for the sliding movement of the quadrant hinge will be hereinafter described. Mounted within the quadrant hinge is a bearing bracket 74, clearly shown in Fig. 7. This bracket is provided with a body part 75, with two outwardly extending parallel arms 76. These arms are so spaced and the body 75 is of such width that the bracket will go between the arms 70 of the quadrant hinge 66 with the outer faces of the arms 76 in contact with the arms 70 of the quadrant hinge. Each of the arms 76 of the bracket carries two roller-equipped pins 80 which are disposed within the arcuate slot 71 of the quadrant hinge. As the bracket 74 is guided in its arcuate movement by the slots 71 of the quadrant hinge, the center of such movement will be substantially within the slot 27 of the table top, thereby permitting angular movement between the table and saw arbor. To the face of the body 75 of the bearing bracket is secured the lower end of the arm 64 of the guard support 32. Means must be provided for holding the body part 75 of the bracket in the plane of the saw so that when the table top 20 is tilted, the support will remain in the same plane and will not be moved by movement of the table. This is brought about by a guide rail 81 which is carried by some fixed part of the body 16 of the saw table as, for instance, the arbor bearing support 82, shown in Figs. 3 and 4. This rail extends across the table a length sufficient to give maximum movement of the guard support and quadrant hinge, to be hereinafter described. The guard rail is provided with a slot 83 with which a guide stud 84 engages. This guide stud is carried by the body 75 of the bearing bracket 74 and extends rearwardly to and through the slot. An adjusting nut 85 and washer 86 is located at each side of the guide rail and these parts provide means for initially adjusting the position of the guard support with relation to the circular saw. Obviously, the washers 86 on each side of the guide rail are left sufficiently loose to provide for free movement of the stud 84 within the slot of the rail as the quadrant hinge is moved back and forth.

It is desirable and necessary that the movement of the quadrant hinge be governed by the movement of the saw being used, and that the entire quadrant hinge, together with its bracket, guard support, and guard, be moved out of the way when the arbor disc is being rotated to bring a different saw in operative position. This function is carried out in my invention by an operating bar 90 which has its rear end secured to the body 75 of the bearing bracket of the quadrant hinge by means of bolts 91. This arm extends forwardly and is provided with an upwardly extending arm 92 and a lower extending arm 96 at its forward end, thus providing an arbor engaging surface 97. It is likewise provided over a substantial portion of its length with a slot 93. An arbor latch 94 is arranged alongside the forward end of the operating bar 90 and is held in sliding relation therewith by means of bolts 89 and 95. These bolts are carried by the body 98 of the latch and are disposed within the slot 93 of the operating bar and serve to guide the arbor latch 94 in its rearward movement in relation to the bar 90. This arbor latch is provided at its forward end with a downwardly extending arm 100 which is joined to the body 98 of the latch by a curved portion 99 having an inner surface 107 that engages and substantially fits the saw arbor when it is in its maximum upper position, as shown in Fig. 1. The arm 100 is spaced apart from the arm 96 of the operating bar when in its normal position, or that shown by the dotted lines in Fig. 2, or full lines in Fig. 1, a distance equal substantially to the diameter of the arbors 21 and 22 (see Figs. 1 and 2). These arms 96 and 100 are preferably curved, as shown in the drawings, on the surfaces which engage the arbor. A helical spring 101 has one of its ends preferably secured to the bolt 94 and its opposite end to a lug 102 carried at the forward end of the operating bar 90, whereby the arbor latch will be normally maintained in the position shown by the dotted lines in Fig. 2, or the full line position of Figs. 1 and 3. A lock bar 103 is pivotally suspended preferably from the bolt 95 and has an arcuate lower surface 104 at its lower end. This lock bar is so shaped that when the arbor 21 (see Fig. 2), is moved slightly beyond the full line position of Fig. 2, the arcuate surface 104 of the bar will engage the upper surface of the arbor should it be attempted to re-engage the arbor with the arbor latch from this position, for reasons to be hereinafter described.

Under normal conditions, the arbor 21 (see Fig. 1) is engaged between the arms 96 and 100 of the operating bar and the arbor latch, respectively, and the arbor is bearing against the surface 97 of the operating bar. The arm 100 will be maintained in proper spaced relation with the arm 96, since the bolt 95 bears against the forward end of the slot 93 when the arbor latch is in the position shown in Fig. 1 or Fig. 3. Any movement of the arbor 21 through the movement of the arbor disc, to raise and lower the saw, will also move the operating bar in the same direction because of the engagement of the parts with the arbor, as just above described. The parts are so designed that the arbor 21 may be moved either forwardly or backwardly substantially 45° from the position shown in Fig. 1, thus giving all necessary degrees of adjustment of the height of the saw.

Should it now be desired to use the rip saw 24, the disc 19 is rotated in counter-clockwise direction, as viewed in Fig. 1, which will cause the operating bar 90 to be forced rearwardly, carrying with it the quadrant hinge 66, bracket 74, guard support 32, and guard 26. As soon as the arbor 21 has moved slightly beyond the position shown by the full line position of the arbor 22 in Fig. 2, the lock bar 103, which has been moved rearwardly as the arbor is reaching such full line position of Fig. 2, will be permitted to move to a vertical position by gravity as soon as the arbor disengages the end thereof and will thus be suspended over the arbor. This will prevent the disc 19 from being accidentally rotated in clockwise direction, and thus injury to the teeth of the saw will be prevented should such movement occur. The operator continues to rotate the saw arbor disc 19 in counterclockwise direction until the arbor 22 has been moved to the position in Fig. 2 indicated by the dot-and-dash circle 105. At this point the arbor 22 will engage the outside surface of the arm 100 of the arbor latch and continued movement of the arbor around its circle of travel by further operation of the arbor disc will move it to the position shown by the dotted line circle 106 or to substantially the inward limit of its movement and where it will engage the surface 97 of the arm 96 of the operating bar 90. Further movement of the arbor 22 from the dotted line position indicated by the circle 106 to the full line position shown in Fig. 2, will cause the lock bar 103 to be swung from its vertical position slightly beyond the inclined position shown by the dotted lines in Fig. 2, where it will be held in such inclined or non-engaging position so long as the arbor is not moved beyond such full line position. When the arbor 22 has reached the position shown in full lines in Fig. 2, it will clear the lower edge of the arm 100 of the arbor latch and will allow the spring 101 to draw the arbor latch substantially to its normal position or that shown in dotted lines in Fig. 2. In such position the arbor 22 may now be received between the arm 100 of the latch and the arm 96 of the bar, and at this point the operator reverses the movement of the arbor disc 19, moving it clockwise so that the arbor will be moved up in between the arms just described and to a position shown by the dotted line circle 106 in Fig. 2. When so engaged with said arms, the arbor 22 may be moved through the predetermined angle of movement in either direction in adjusting the saw to its proper height while moving the guard support 32 therewith and maintaining the guard in its proper relation with the saw. It is obvious, of course, that when moving the saw 24 carried by the arbor 22 to its point of engagement with the arbor latch 94 and operating bar 90, as just above described, it is necessary to raise the guard 26 by rotating it upon its pivot 33 and to move it to a position where it will not interfere with the passage of the saw through the slot 27 of the table top until such time as it has been engaged between the arm 100 of the arbor latch and the arm 96 of the operating bar, as just above described, after which the guard may be lowered and the saw moved back and forth within its limit of travel without the possibility of its striking any part of the guard or support.

Referring now to the form shown in Fig. 9, I show my invention as applied to a sawing appliance having a tiltable table 112 and a single saw arbor 110 which is carried by the bearing plate 111 of the appliance. The table 112 of this appliance has a slot 113 formed therein. The quadrant hinge 114 of my invention, when applied to this form of table, is secured rigidly to the underside of the table and at each side of the slot by means of screws 115. This quadrant is provided with side arms 116 each of which is formed with an arcuate slot 120. Mounted between the arms 116, as in the other form of my invention, is the bearing bracket 121 which carries roller-equipped pins 122 that engage with the arcuate slots 120 of the hinge, as in the other form of invention. As in the other form of invention, the guard support 32 is secured to the bearing bracket 121 by suitable means. So as to maintain the guard support 32 in alignment with the saw, an aligning bracket 123 is provided. This bracket is secured to the bearing plate 111 preferably by means of bolts 124 and has an interspaced and upwardly extending arm 125 which projects upwardly along the inner face of the bearing bracket 121 and which is preferably formed with a slot (not shown) for the engagement of a bolt 126. The bolt 126 normally secures the aligning bracket to the bearing bracket, but when adjustment of the saw is made as to height, the bolt 126 must be loosened, whereupon it will move through the slot formed in the arm 125 until the desired position of the saw is reached, whereupon it will then be tightened so as to securely clamp the bearing bracket to the plate 111. Obviously, the plate 111 is a convenient part of the appliance to which to attach the bracket, but any other suitable stationary part of the appliance may be used for this purpose.

It will be obvious from the foregoing, that as the saw table 112 is tilted to the position shown in Fig. 9, or any intermediate position, the quadrant hinge will be moved therewith and over the roller-equipped pins 122, the bearing bracket 121 remaining in fixed position and in the same plane as the saw by the means just above described.

The form of invention shown in Fig. 10 shows my device as applied to a sawing appliance having a tilting arbor 130. In such cases, as is well known, the table 131 is stationarily arranged and the saw is moved to the desired angle by movement of the saw arbor 130 through the same angle. The figure shows, in diagrammatic manner, a plate 132 which is movable with the saw arbor and its bearing. In this form, as in the form of Fig. 9, the quadrant hinge 114 is permanently secured to the bottom of the table 131 and the bearing bracket 121 which carries the guard support 32 is movable with the bracket and the saw arbor. The aligning bracket 123 is secured to the plate 132 by means identical with those shown in Fig. 9.

From the foregoing, it will be obvious that since in my invention the sole mounting for the guard is the guard support which is located in line with and in substantially the same plane as the saw, the entire saw table is free of any obstructions such as the usual arms and the like for supporting saw guards.

If desired, however, instead of mounting the guard support beneath the table, it is obvious that it might be supported from the top of the table by the type of arm usually employed for guards. This modification of the invention is shown in Fig. 11 where the support 133 is formed with an upwardly projecting portion 134 to which the arm 135 of the horizontal mounting 136 is suitably secured. This horizontal mounting extends to the edge of the table, as is customary, where it is secured in the usual manner to the upright member 137.

While I have shown the quadrant hinge mounted upon the table in all forms of my invention, it may, if desired, be carried by any other suitable part of the structure, so long as it provides a suitable bearing for the bracket and permits arcuate movement between the bracket and hinge.

Obviously, these and other modifications of the details herein shown and described may be made without departing from the spirit of my invention or the scope of the appended claims, and I do not, therefore, wish to be limited to the exact embodiment herein shown and described, the forms shown being merely preferred embodiments thereof.

Having thus described my invention, what I claim is:

1. In a sawing appliance, the combination with a saw table having a slot formed therein, two saw arbors, and means for bringing the saw carried by either arbor into operative relation with the slot of the table, of a guard support, a guard pivotally mounted upon the support, quadrant means for maintaining the support in alignment with the saw being used irrespective of the angular arrangement of the saw and table, said quadrant means comprising a quadrant hinge, guideways for slidably attaching the quadrant hinge to the table for movement in a direction parallel with the slot thereof, a bearing bracket carried by the quadrant hinge, means connecting the bracket with the hinge for permitting relative arcuate movement therebetween, means for attaching the support to the bearing bracket, means connecting the bracket to the sawing appliance, and operating means carried by the hinge means and connected with either of the saw arbors, whereby the guard will be moved back and forth as the saw is being moved in an arcuate path while being adjusted vertically with respect to the table top.

2. In a sawing appliance, the combination with a saw table having a slot formed therein, two saw arbors, and means for bringing the saw carried by either arbor in operative relation with the slot of the table, of a guard support, a guard pivotally mounted upon the support, slidably mounted hinge means secured to a suitable part of the appliance and to the guard support for maintaining the support in alignment with the saw being used irrespective of the angular arrangement of the saw and table, operating means carried by the hinge means and connected with either of the saw arbors, whereby the guard will be moved back and forth as the saw is being moved in an arcuate path while being adjusted vertically with respect to the table top, said operating means comprising an operating bar, said bar being attached to a part of the hinge, an arbor latch slidably carried by said bar and formed with an arm, said bar and said latch being so proportioned as to engage the arbor of the saw being operated, whereby movement of the arbor back and forth will cause the guard to be moved in unison with the saw.

3. In a sawing appliance, the combination with a slotted table, two saw arbors, and means for bringing either saw arbor into operative position, of a slidably mounted guard support, a guard carried by the support, means for moving the support and the guard in unison with the movement of the active saw arbor, comprising an operating bar carried by the support, said bar having a downwardly extending arm at its forward end, an arbor latch slidably carried at the forward end of the operating bar and having a downwardly extending arm, and spring means for maintaining the arm of the arbor and the arm of the bar in spaced relation, whereby they may be engaged with the arbor being used.

4. In a sawing appliance, the combination with a slotted table, two saw arbors, and means for bringing either saw arbor into operative position, of a guard, a support for said guard, and means for maintaining the support in substantial alignment with the active saw irrespective of the relative angle of such saw and said table, comprising a quadrant hinge slidably attached to the table, a bearing bracket carried by said hinge and adapted to have oscillatory movement therewith, means for slidably attaching said bracket to that part of the sawing appliance which carries the saw arbor, said support being carried by said bracket, and means for moving the support and the guard in unison with the movements of the saw arbors, whereby said support will follow in a horizontal plane the arcuate movement of the active saw arbor.

5. In a sawing appliance, the combination with a slotted table, two saw arbors, and means for bringing either saw arbor into operative position, of a guard, a support for said guard, and means for maintaining the support in substantial alignment with the active saw irrespective of the relative angle of such saw and said table, comprising a quadrant hinge slidably attached to the table, a bearing bracket carried by said hinge and adapted to have oscillatory movement therewith, means for slidably attaching said bracket to that part of the sawing appliance which carries the saw arbor, said support being carried by said bracket, means for moving the guard in unison with the movements of the saw arbors, whereby said support will follow in a horizontal plane the arcuate movement of the active saw arbor, comprising an operating bar carried by the support, said bar having a downwardly extending arm at its forward end, an arbor latch slidably carried at the forward end of the operating bar and having a downwardly extending arm, and spring means for maintaining the arm of the arbor and the arm of the bar in spaced relation, whereby they may be engaged with the arbor being used.

6. In a sawing appliance, the combination with a slotted table, two saw arbors, and means for bringing either saw arbor into operative position, of a guard, a support for said guard, and means for maintaining the support in substantial alignment with the active saw irrespective of the relative angle of such saw and said table, comprising a quadrant hinge slidably attached to the table, a bearing bracket carried by said hinge and adapted to have oscillatory movement therewith, a guide rail carried by a part of the sawing appliance which moves with the saw arbors, and means connecting the rail with the bearing bracket, said support being carried by and secured to said bracket, and means for moving the support and the guard in unison with the movements of the saw arbors, whereby said support will follow in a horizontal plane the arcuate movement of the active saw arbor.

7. In a sawing appliance, the combination with a slotted table, two saw arbors, and means for bringing either saw arbor into operative position, of a guard, a support for said guard, and means for maintaining the support in substantial alignment with the active saw irrespective of the relative angle of such saw and said table, comprising a quadrant hinge slidably attached to the table, a bearing bracket carried by said hinge and adapted to have oscillatory movement therewith, means for slidably attaching said bracket to that part of the sawing appliance which carries the saw arbor, said support being carried by and secured to said bracket, means for moving the support and the guard in unison with the movements of the saw arbors, whereby said support will follow in a horizontal plane the arcuate movement of the active saw arbor, and a latch lock carried by the arbor latch and engageable with the saw arbor which has just been moved out from between the arms of the latch and bar, whereby such arbor is prevented from returning to a position between the said arms.

8. In a sawing appliance, the combination with a saw table having a slot therein, two saw arbors, said table and said arbors being so mounted as to have relative tilting movement, and means for bringing the saw carried by either arbor into operative relation with the slot of the table, of a guard support permanently projecting through the slot of the table, a guard pivotally mounted upon the support, hinge means slidably supported by the table for movement in substantial parallelism with the table top and constituting the sole support for the guard support for maintaining the support in alignment with the saw being used, irrespective of the angular arrangement of the saw and table, and operating means carried by the hinge means and engageable with either of the saw arbors, whereby the guard will be moved back and forth as the saw is being moved in an arcuate path while being adjusted vertically with respect to the table top.

MICHAEL F. HAMMOND.